(12) United States Patent
Gollier

(10) Patent No.: US 7,324,287 B1
(45) Date of Patent: Jan. 29, 2008

(54) MULTI-FLUID LENSES AND OPTICAL DEVICES INCORPORATING THE SAME

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/593,767

(22) Filed: Nov. 7, 2006

(51) Int. Cl.
*G02B 3/14* (2006.01)
(52) U.S. Cl. ...................... 359/666; 359/665
(58) Field of Classification Search ......... 359/665–667
See application file for complete search history.

(56) References Cited

U.S. PATENT DOCUMENTS

| 4,477,158 | A |   | 10/1984 | Pollock et al. ............ 351/169 |
| 5,438,486 | A |   | 8/1995  | McNair ...................... 362/61  |
| 5,491,583 | A | * | 2/1996  | Robb ......................... 359/356 |
| 6,188,526 | B1|   | 2/2001  | Sasaya et al. ............... 359/666 |
| 6,369,954 | B1|   | 4/2002  | Berge et al. ................ 359/666 |
| 6,445,509 | B1| * | 9/2002  | Alden ........................ 359/666 |
| 6,538,823 | B2|   | 3/2003  | Kroupenkine et al. ...... 359/665 |
| 6,778,328 | B1|   | 8/2004  | Aizenberg et al. .......... 359/665 |
| 6,936,809 | B2|   | 8/2005  | Viinikanoja ................ 250/216 |
| 2005/0002113 | A1 | | 1/2005 | Berge ......................... 359/666 |
| 2006/0152814 | A1 | | 7/2006 | Peseux ....................... 359/665 |

FOREIGN PATENT DOCUMENTS

WO        2004/038480        5/2004

* cited by examiner

*Primary Examiner*—M. Hasan
(74) *Attorney, Agent, or Firm*—Joseph M. Homa; James E. Beyer

(57) ABSTRACT

The present invention provides a variety of fluid lens configurations that enable beam steering and focus adjustment. For example, according to one aspect of the present invention, a fluid lens is configured such that an optical signal may propagate from an input side of the lens to an output side of the lens along an axis of optical propagation extending through first and second lens surfaces defined by the immiscible fluids of the lens. Respective tunable lens surfaces are formed along the interfaces between the immiscible fluids and an external signal is capable of changing the shape of those surfaces. Because the two lens components forming the lens surfaces are laterally offset, the focal length and beam steering of the lens can be tuned by varying the shape of the surfaces. Additional embodiments are disclosed.

20 Claims, 6 Drawing Sheets

MULTI-FLUID LENSES AND OPTICAL DEVICES INCORPORATING THE SAME

BACKGROUND OF THE INVENTION

The present invention relates to tunable fluid lenses and optical devices incorporating tunable fluid lenses.

SUMMARY OF THE INVENTION

According to one embodiment of the present invention, a fluid lens is configured such that an optical signal may propagate from an input side of the lens to an output side of the lens along an axis of optical propagation extending through first and second lens surfaces defined by first, second, and third substantially immiscible fluids of the lens. The lens includes a fluid reservoir that is configured such that the first immiscible fluid is mechanically coupled to the third immiscible fluid via the second immiscible fluid. The respective lens surfaces are formed along the interfaces between the first, second, and third immiscible fluids.

According to another embodiment of the present invention, the first and second lens surfaces are offset relative to each other along a direction x orthogonal to the axis of optical propagation z of the lens. A third lens surface may be provided along an interface of two addition immiscible fluids and one or both of the first and second lens surfaces can be offset relative to the third lens surface along a direction y orthogonal to the direction x and the axis of optical propagation z.

According to yet another embodiment of the present invention, an optical system is provided comprising a fluid lens according to the present invention. The fluid lens is configured in the system to direct light propagating in the system by creating a global beam steering effect in the propagating light, varying the focal length of the fluid lens, or both.

Accordingly, it is an object of the present invention to provide improved designs for tunable fluid lenses and improved semiconductor lasers and other types of opto-mechanical packages incorporating such lenses. For example, it may be advantageous to utilize beam steering where a semiconductor laser, such as a distributed-feedback (DFB) laser or a distributed-Bragg-reflector (DBR) laser, is combined with a light wavelength conversion device, such as a second-harmonic-generation (SHG) crystal, to create a short wavelength source. More specifically, the SHG crystal can be configured to generate higher harmonic waves of the fundamental laser signal by tuning, for example, a 1060 nm DBR or DFB laser to the spectral center of a SHG crystal, which converts the wavelength to 530 nm, i.e., in the green portion of the visible spectrum. A tunable lens according to the present invention can be positioned to direct light from the laser chip to the light wavelength conversion device. Other objects of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
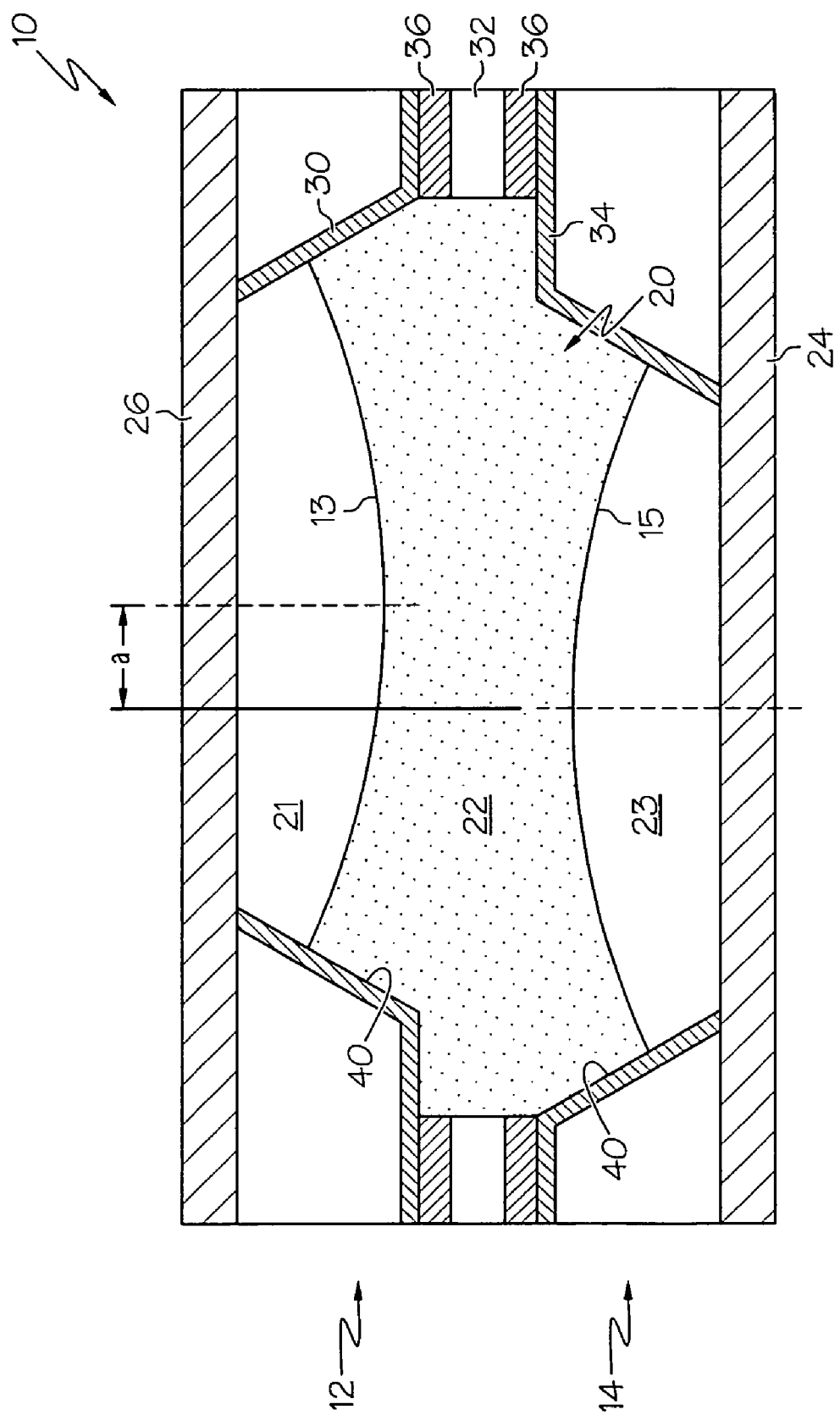
FIG. 1 is a schematic illustration of a tandem fluid lens according to one embodiment of the present invention.

Referring initially to FIG. 1, a fluid lens 10 according to one embodiment of the present invention is illustrated. Generally, the fluid lens 10 illustrated in FIG. 1 comprises first and second fluid lens components 12, 14. The first fluid lens component 12 comprises a first lens surface 13 along an interface of first and second immiscible fluids 21, 22 contained within a fluid reservoir 20 of the lens 10. Similarly, the second fluid lens component 14 comprises a second lens surface 15 along an interface of second and third immiscible fluids 22, 23 contained within the fluid reservoir 20. For the purposes of defining and describing the present invention, it is noted that reference herein to a lens component "comprising" a lens surface should not be interpreted as a limitation on the physical location of the surface. Rather, the surface should be read as a part of the lens component, regardless of its position. For example, in the embodiment of the present invention illustrated in FIGS. 1 and 2, it is contemplated that the first lens surface 13 will be part of the first lens component regardless of how far the surface extends in the direction of the third immiscible fluid 23.

The index of refraction of the second immiscible fluid 22 is different than the respective indices of refraction of the first and third immiscible fluids 21, 23, to ensure that the first and second lens surfaces 13, 15 introduce desired optical effects in the lens 10. Specifically, where an optical signal propagates from an input side of the lens 10 to an output side of the lens 10 along an axis of optical propagation extending through the first and second lens surfaces 13, 15, the respective indices of refraction should be different enough to introduce an optically significant change in the signal at each lens surface.

For example, and not by way of limitation, in the context of a semiconductor laser comprising a laser chip, a light wavelength conversion device, and a fluid lens 10 according to the present invention, the fluid lens 10 can be positioned along the optical path between the optical output of the laser chip and the input of a PPLN wavelength conversion crystal. Preferably, a pair of collimating lenses are provided and the fluid lens 10 is positioned in a collimated portion of the optical path between the collimating lenses. The fluid lens 10 may be tuned in the manner described herein to improve coupling efficiency between the laser output and the PPLN crystal by realigning the propagating light relative to the input face of the PPLN crystal, by adjusting the focus of the propagating light at the input face of the PPLN crystal, or both. Although the change introduced in the optical signal may be static, the various embodiments of the present invention are particularly well-suited for creating a beam steering effect in an optical system by varying the degree to which the optical signal is redirected. Further, the various embodiments of the present invention are particularly well-suited for providing a variation in focal length by varying the degree to which the focal length of the lens 10 is varied.

Specifically, referring to FIG. 1 as an example, the first and third immiscible fluids 21, 23 can be provided as electrically responsive fluids and the lens 10 may comprise control electrodes 30, 32, 34 configured to generate respective electric fields capable of altering the shape and/or orientation of one or both of the lens surfaces 13, 15. The control electrodes 30, 32, 34 may be configured to at least partially bound the fluid reservoir 20, as is illustrated in FIG. 1, where the electrodes 30 and 34 comprise partially conical wall portions. The angle at which the electrically responsive lens fluid interfaces with the conical wall of the reservoir and the point along which the fluid interfaces with the wall of the reservoir is a function of the control voltages applied to the control electrodes. In this manner, the shape and orientation of the respective lens surfaces can be controlled as a function of the control voltage applied to the control electrodes.

For example, and not by way of limitation, in the specific case where the electrode and the geometry of the first and second lens components 12, 14 are rotationally symmetric, the variation of the electrode voltages changes the radii of curvature of the first and second lens surfaces 13, 15. This change in curvature changes the focal length of the first and second lens components 12 and 14. If the lenses are laterally offset a distance a, as is illustrated in FIG. 1, changes in the radii of curvature of the lens components 12, 14 can be translated into selective adjustment of the direction of propagation of a propagating optical signal and adjustment of the focal length of the lens 10. Beam focus and beam steering can be adjusted independently by applying different signals to the lens components 12 and 14. For example, the following equations illustrate beam steering and focus adjustment of an optical beam spot at the input of a PPLN wavelength conversion crystal in an optical configuration comprising a laser diode, a first collimating lens L1, a fluid lens 10 comprising the first and second lens components 12, 14, a second collimating lens L2, and a PPLN crystal in succession along an optical path:

$$D_y = f_{L2}(a)\left(\frac{1}{f_1} - \frac{1}{f_2}\right)$$

$$D_z = f_{L2}^2\left(\frac{1}{f_1} + \frac{1}{f_2}\right)$$

where $D_y$ is the lateral translation of the beam spot at the input of the PPLN crystal, $D_z$ is the focus translation of the of the beam spot at the input of the PPLN crystal, $f_1$ and $f_2$ are the respective focal lengths of the first and second fluid lens components 12, 14, and $f_{L2}$ is the focal length of the second collimating lens L2. Accordingly, the lateral position of the beam spot can be adjusted by modifying $f_1$ and $f_2$ without changing the sum $$\left(\frac{1}{f_1} + \frac{1}{f_2}\right).$$

Conversely, the focus can be changed by adjusting $f_1$ and $f_2$ while maintaining the difference $$\left(\frac{1}{f_1} - \frac{1}{f_2}\right)$$

constant.

Figure 2:
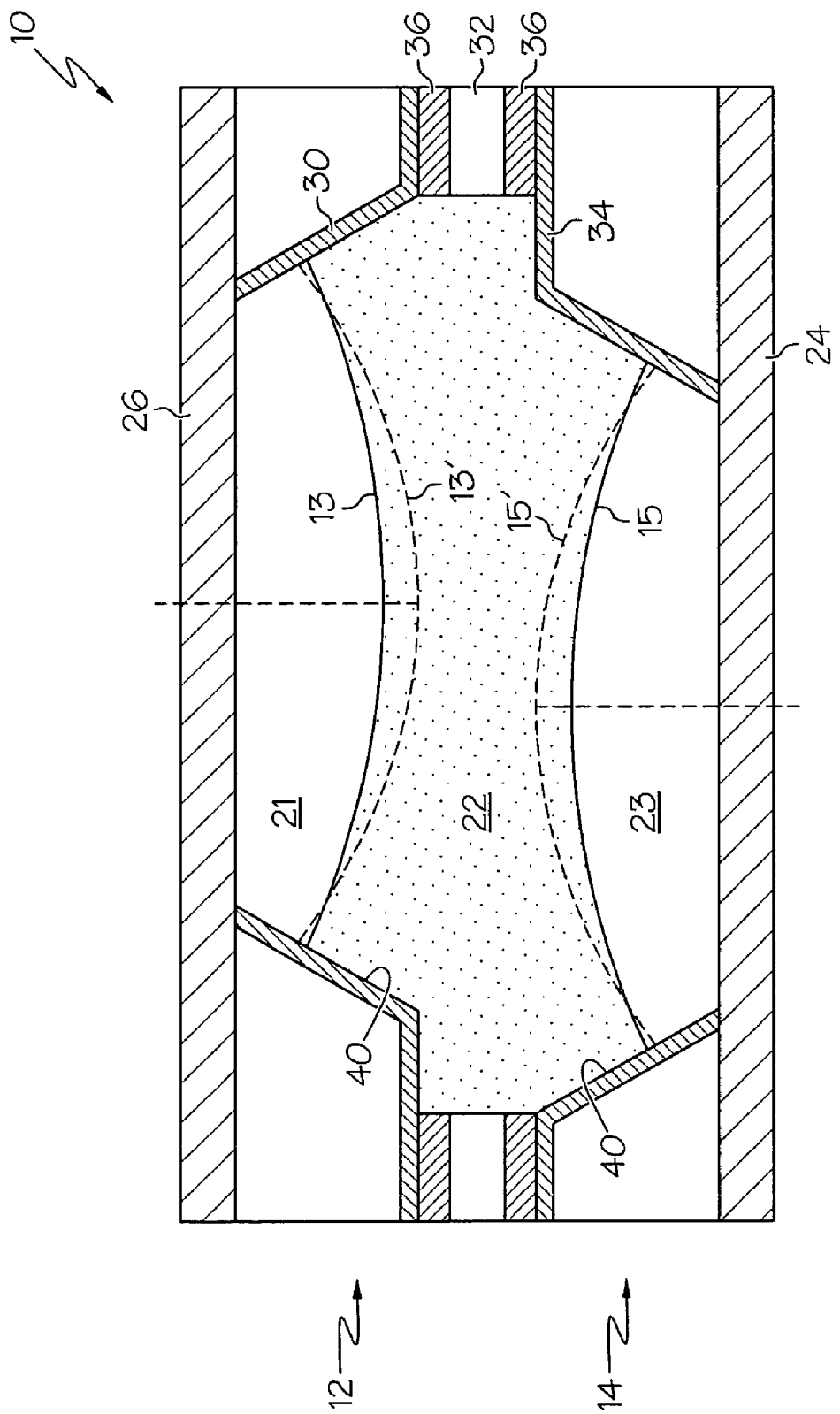
FIG. 2 is a schematic illustration of the tandem fluid lens of FIG. 1 in one biased state according to the present invention.
Figure 3:
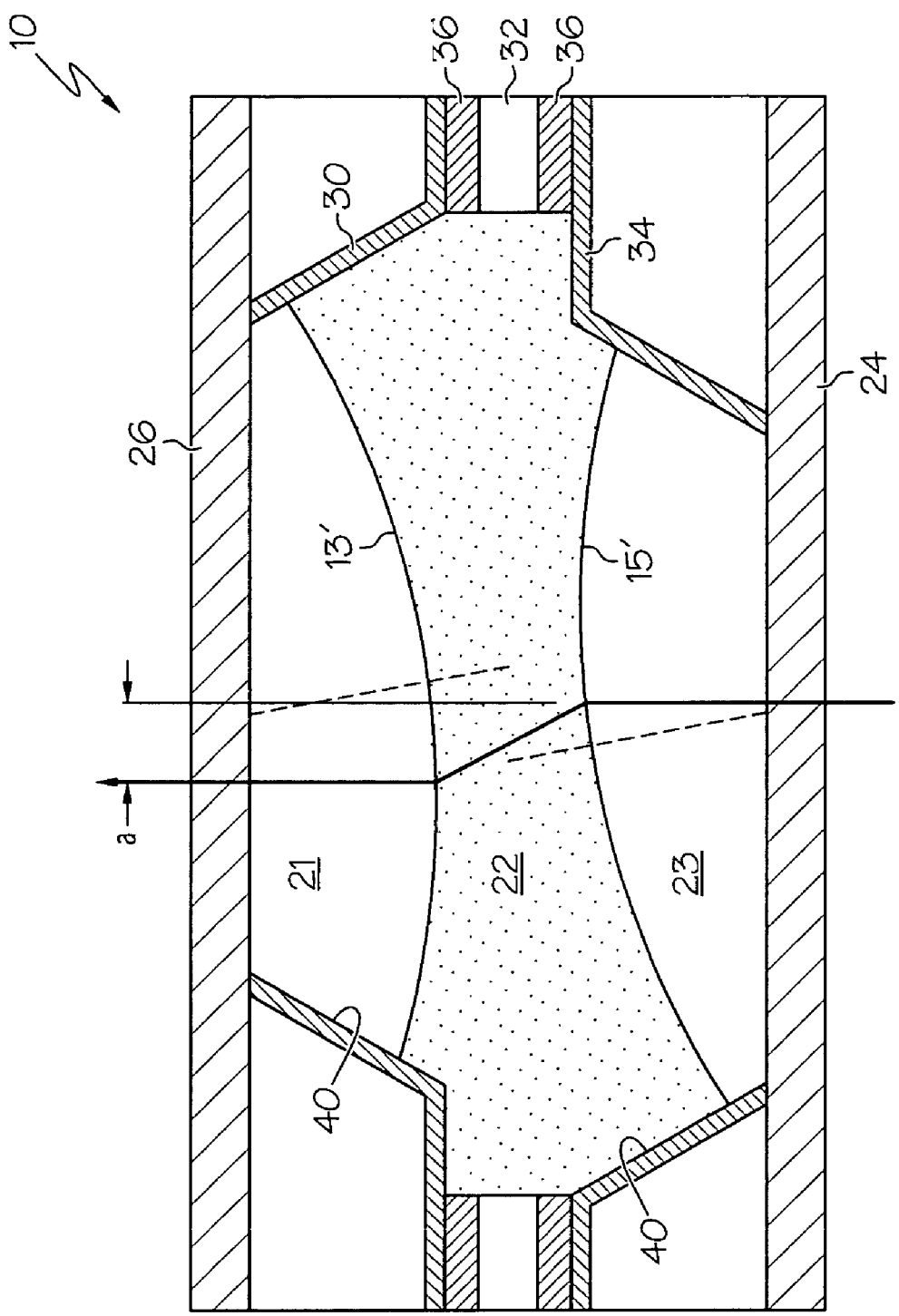
FIG. 3 is a schematic illustration of the tandem fluid lens of FIG. 1 in another biased state according to the present invention.

FIG. 2 illustrates an example of a contemplated alteration of the shape of the lens surfaces 13, 15. In the illustration, the control electrodes 30, 32, 34 are circularly symmetric and would be provided with electric potentials that would generate lens surfaces 13', 15' having an altered degree of curvature. FIG. 3 illustrates an example of a contemplated alteration of the orientation of the lens surfaces of the first and second lens components 12, 14. In the illustration, the control electrodes 30, 32, 34 are not circularly symmetric and would be provided with electric potentials that would generate lens surfaces 13', 15' having an altered orientation.

It is contemplated that the concepts of the present invention may be employed to impart a virtually unlimited set of lens surface orientations and shapes. For example, it is contemplated that each control electrode 30, 32, 34 can be subdivided to include two or more individually controllable component electrodes or electrode portions. More specifically, while the control electrodes 30 and 34 may comprise respective, continuous conical electrodes and the control electrode 32 may comprise a continuous ring electrode, it is contemplated that each conical or ring electrode may be divided along an arc of the electrode into component electrodes to provide for enhanced control of the lens surfaces 13, 15. Examples of electrode components used in the context of a tunable fluid lens are illustrated in U.S. Pat. No. 6,538,823. Only those portions of this patents necessary to facilitate an understanding of the manner in which an electrode in a tunable fluid lens can be used to alter the curvature of a fluid lens surfaces are incorporated herein by reference.

For the purposes of describing and defining the present invention, it is noted that a fluid that is "electrically responsive" may be an electrically conductive fluid, a poled fluid of limited conductivity, or any fluid that can be arranged to physically respond to the application of an electric or magnetic field thereto, in the manner described herein. It is also contemplated that it may be sufficient to provide only the second immiscible fluid 22 as the electrically responsive fluid because its shape and orientation of the second immiscible fluid 22 will affect the shape and orientation of the first and third immiscible fluids 21, 23 by virtue of the mechanical coupling between the second immiscible fluid 22 and the other two immiscible fluids. In addition, it is also contemplated that all of the immiscible fluids 21, 22, 23 provided in the lens can be selected to be electrically responsive.

The particular manner in which the electric field generated by the control electrodes can be used to alter the shape and orientation of the lens surfaces 13, 15 is beyond the scope of the present invention and may be discerned from a variety of readily available teachings on the subject. For example, and not by way of limitation, U.S. Pat. Nos. 6,538,823, 6,778,328, and 6,936,809 provide specific instruction on the subject. Only those portions of these patents necessary to facilitate an understanding of the manner in which an electric field can be used to alter the curvature of the convex lens surfaces are incorporated herein by reference.

In practicing the present invention, it is contemplated that it will often be preferable to maximize operational versatility by ensuring that suitable control electronics and respective independently controllable electrodes 30, 32, 34 are provided to allow the generation of at least two distinct electric fields capable of altering independently the respective shapes of the first and second lens surfaces 13, 15. To this end, the lens 10 is illustrated in FIG. 1 and elsewhere as comprising respective electrical insulators 36 positioned between the control electrodes 30, 32, 34. Electrical insulators 36 may bound the fluid reservoir 20, for example as shown in FIG. 1.

Figure 6B:
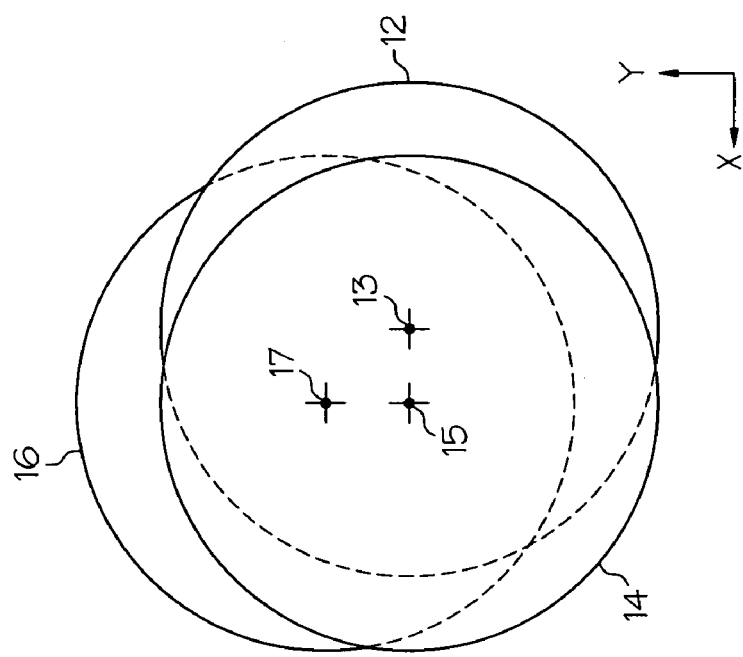
FIGS. 6A and 6B illustrate an embodiment of the present invention comprising three lens components.
Figure 6A:
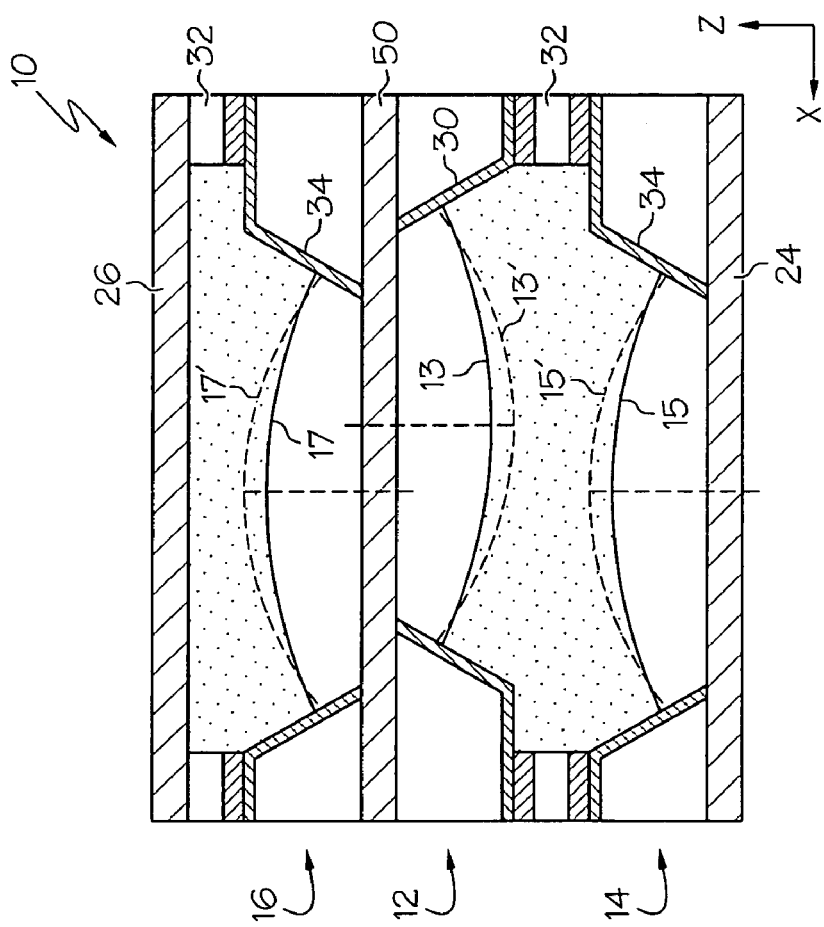

One significant aspect of the present invention is illustrated with reference to FIGS. 6A and 6B, where the respective positions of the first and second lens components 12, 14 are illustrated with reference to an orthogonal X-Y-Z coordinate system. As is illustrated in FIG. 6A, the first and second lens components can be positioned and the control electrodes 30, 32, 34 can be controlled such that the corresponding lens surfaces 13, 15 of each component are offset relative to each other along a direction x, which is orthogonal to the direction z representing the general direction of the axis of optical propagation. FIG. 6B schematically illustrates the offset relationship of the respective lens components 12, 14 in the X-Y plane. This offset relationship allows a user to achieve significant beam steering in the x direction with a control electrode configuration of relatively low complexity.

FIGS. 6A and 6B also illustrate a third fluid lens component 16 comprising a third lens surface 17 along an interface of first and second immiscible fluids 21, 22 contained within an additional fluid reservoir of the lens 10. The first lens surface 13 of the first lens component 12 is offset relative to the third lens surface 17 of the third lens component 16 along a direction y orthogonal to the direction x. As a result, alterations in the shape and/or orientation of the third lens surface 17 will allow a user to achieve significant beam steering in the y direction with a control electrode configuration of relatively low complexity. The resulting combination of offset lens components illustrated in FIGS. 6A and 6B will collectively permit convenient beam steering throughout the X-Y plane, while preserving the above-noted ability to vary the focus of the lens 10.

Regarding the fluid reservoirs illustrated in FIGS. 1-6 of the present application, it is contemplated that the lens surface interface walls 40 can be configured as respective inside circumferences of a conical or cylindrical wall. However, it is also contemplated that a variety of conventional and yet-to-be developed reservoir configurations will be suitable for use in the lens components of the present invention. In the illustrated embodiments, each fluid reservoir 20 is at least partially bound by an input window 24 and an output window 26, each of which may be positioned along the axis of optical propagation of the lens 10. The reservoir 20 is also bounded by walls 40 that interface with the lens surfaces 13, 15, 17. These walls generally extend along the axis of optical propagation and may be parallel to the axis of optical propagation or inwardly or outwardly conical, i.e., inclined relative to the axis of optical propagation. In addition, it is contemplated that the walls may comprise a relatively simple linear wall or more complex curved walls. It is further contemplated that respective portions of the walls 40 may comprise a combination of distinct wall portions of varying shape and orientation.

For example, it is noted that alternative reservoir profiles may yield a more linear response to variations in control voltage or may be more or less optimal in terms of the optical parameter to be tuned by the lens. In other circumstances, it may be preferable to achieve non-linear or exponential responses to variations in the control voltage. Contemplated profiles include, but are not limited to, the above-described linear conical profile, hyperbolic conical profiles, parabolic conical profiles, cylindrical profiles, rectangular profiles, or other linear or non-linear profiles, including combinations thereof.

Figure 4:
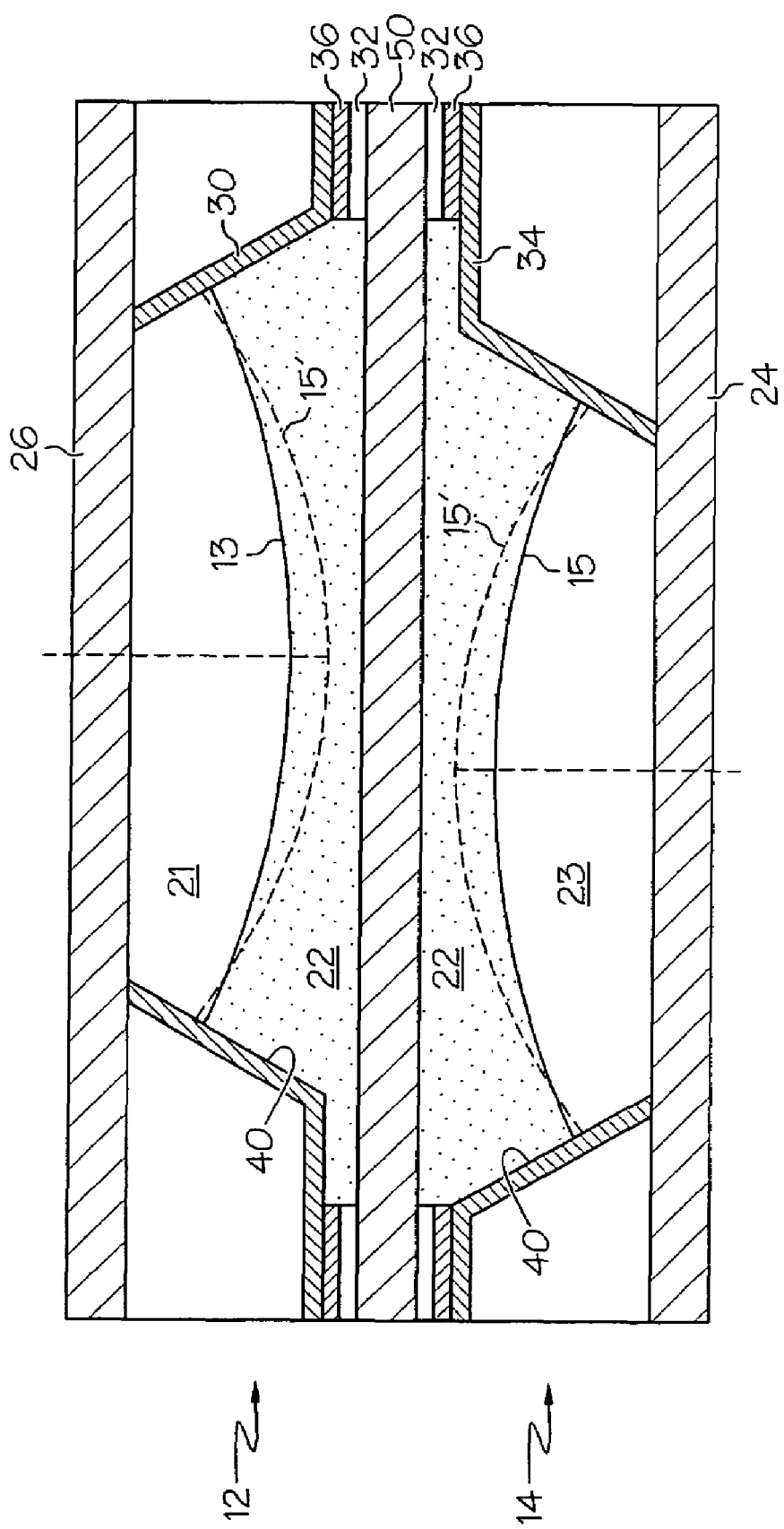
FIG. 4 is a schematic illustration of a tandem fluid lens according to another embodiment of the present invention.
Figure 5:
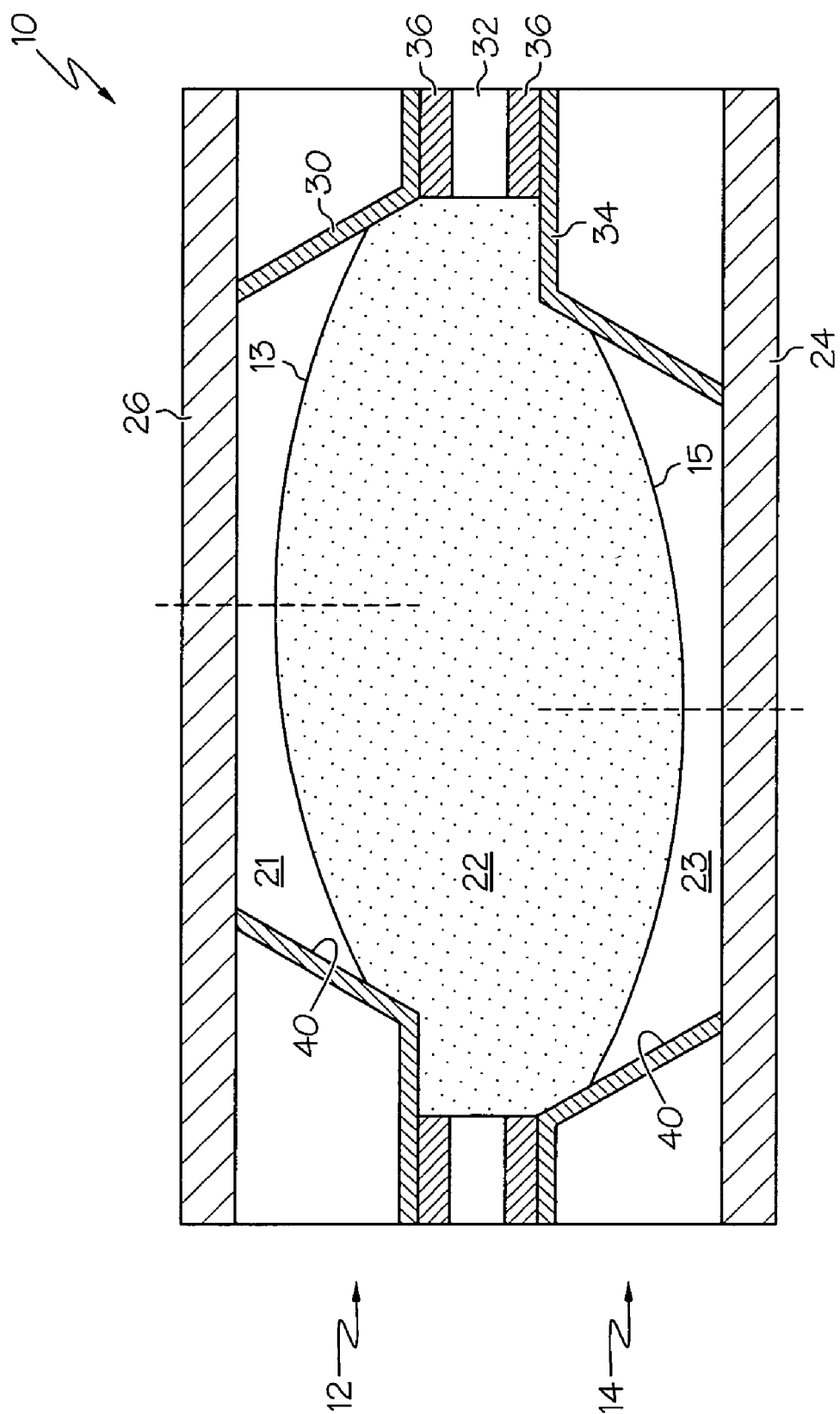
FIG. 5 is a schematic illustration of a tandem fluid lens according to an additional embodiment of the present invention.

Although FIGS. 1-3 illustrate a fluid reservoir having a substantially continuous volume, where the second immiscible fluid 22 mechanically couples the first immiscible fluid 21 to the third immiscible fluid 23, it is contemplated that the first immiscible fluid 21 may be mechanically coupled to the third immiscible fluid 23 via the second immiscible fluid 22 and one or more additional immiscible fluids. Further, as is illustrated in FIG. 4, a relatively rigid partition 50 can be provided in the second immiscible fluid to partition the fluids and help isolate movement of the respective fluid lens surfaces 13, 15 from each other, stabilize the structure of the lens 10, ease assembly of the lens 10, etc. The rigid partition 50 may be provided as a relatively thin layer, e.g., a membrane, or a relatively thick component, e.g., a transparent window.

Although the specific constitution of the first, second, and third immiscible fluids 21, 22, 23 is beyond the scope of the present invention, it is noted that the immiscibility of these fluids is typically attributable to the properties of the fluids themselves. Preferably, the fluids comprise transparent liquids having similar densities. Adjacent fluids within the lens typically have distinguishable refractive indices and may have different polar properties. For example, and not by way of limitation, an electrically responsive oil may be used as the first and third immiscible fluids while an aqueous-based fluid may be provided as the second immiscible fluid. U.S. Pat. No. 4,477,158 and U.S. Pub. No. 2006/0152814 provide additional teachings related to the use of immiscible fluids in lenses. It is also contemplated that the immiscibility of the fluids may be enhanced by, or may be solely the result of, a flexible membrane positioned between the fluids. Further, it is noted that immiscible fluids according to the present invention need not be immiscible with respect to all fluids within the lens 10. Rather, the fluid need only be immiscible with respect to an adjacent fluid.

The lens surface 13 illustrated in FIGS. 1-4 may be said to be convex, taken from the perspective of the first immiscible fluid 21. Similarly, the lens surface 15 illustrated in FIGS. 1-4 may be said to be convex, taken from the perspective of the third immiscible fluid 23. In contrast, the lens surfaces 13, 15 illustrated in FIG. 5 may be said to be concave. Accordingly, embodiments of the present invention contemplate convex or concave lens surfaces. Further, although not illustrated, embodiments of the present invention are contemplated where one of the lens surface 13, 15 is concave, while the other is convex. The properties of the immiscible fluids 21, 22, 23, the properties of the associated lens surface interface walls 40, and the nature of the electric potential generated at the control electrodes 30, 32, 34, will cooperate to determine the particular lens surface shape embodied in the present invention.

Although the lens surfaces illustrated in FIGS. 1-5 have substantially uniform, circumferential surfaces when viewed in a cross-sectional plane cutting through and parallel to the axis of optical propagation of the lens 10, it is noted that in practice the lens surfaces will often vary from the uniform circular arcs illustrated. For example, the convex lens surfaces may more closely approximate an elliptical or other non-circular arc and may include flat or nearly flat surface portions in their respective cross sections. Further, it is contemplated that the lens fluids may form a flat or nearly flat lens surface.

The concepts of the present invention have been illustrated above with reference to the use of electrically responsive lens fluids and respective control electrodes. However, it is also contemplated that the first and second lens fluids may comprise a hydraulically responsive, pressure sensitive lens fluid where the curvature of the convex lens surfaces can be controlled by controlling the supply of fluid to the respective fluid reservoirs. The first and second fluid supplies can be distinct fluid supplies or a common fluid supply. The use of pressure sensitive lens fluids within liquid lenses is taught with more particularity in U.S. Pat. Nos. 5,438,486 and 6,188,526. Only those portions of these patents necessary to support an understanding of the nature in which pressure sensitive fluid lenses can be constructed are incorporated herein by reference.

Where a fluid lens according to the present invention is configured to direct light propagating in an optical system, it is contemplated that the lens may further comprise collimating optics configured such that light directed from an input optical device, e.g., a laser chip, to an output optical device, e.g., a SHG crystal, is substantially collimated. Further, collimating optics can be introduced to alleviate optical power demands that would otherwise fall on the tunable lens. Specifically, the collimating optics can be configured to function primarily as the first order optical components of the system while the tunable lens can be designed to function primarily as a second order correction system.

It is contemplated that tunable fluid lenses according to the present invention will have particular utility in small and large scale opto-mechanical packages because it is typically difficult to ensure proper mechanical alignment of the optical components in such packages. For example, in the context of a semiconductor laser comprising a laser chip and a second-harmonic-generation (SHG) waveguide crystal light wavelength conversion device, the present inventor has recognized that it is often necessary to align optical components with sub-micron tolerances. By way of illustration, and not limitation, it is noted that additional opto-mechanical packages contemplated by the present invention include second harmonic generation laser packages, pump laser packages, and other optical packages where a single or multimode optical signal is transmitted between optical waveguides, optical fibers, optical crystals, or various combinations of active or passive optical components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. The term "substantially" is further utilized herein to represent a minimum degree to which a quantitative representation must vary from a stated reference to yield the recited functionality of the subject matter at issue.

Having described the invention in detail and by reference to specific embodiments thereof, it will be apparent that modifications and variations are possible without departing from the scope of the invention defined in the appended claims. More specifically, although some aspects of the present invention may be identified herein as preferred or particularly advantageous, it is contemplated that the present invention is not necessarily limited to these aspects of the invention.

What is claimed is:

1. A fluid lens comprising first and second fluid lens components, wherein:
   said first fluid lens component comprises a first lens surface formed along an interface of first and second fluids contained within a fluid reservoir of said lens;
   said first and second fluids are immiscible with respect to each other;
   said second fluid lens component comprises a second lens surface formed along an interface of second and third fluids contained within said fluid reservoir;
   said second and third fluids are immiscible with respect to each other;
   said first fluid is mechanically coupled to said third fluid via said second fluid;
   an index of refraction of said second fluid is substantially different than an index of refraction of said first and third fluids;
   said fluid lens is configured such that an optical signal may propagate from an input side of said lens to an output side of said lens along an axis of optical propagation extending through said first and second lens surfaces of said first and second lens components; and
   said fluid lens is configured to permit alteration of at least one of said first and second lens surfaces.

2. A fluid lens as claimed in claim 1 wherein said first and second lens surfaces are offset relative to each other along a direction x orthogonal to said axis of optical propagation z.

3. A fluid lens as claimed in claim 1 wherein:
   said fluid lens further comprises a third fluid lens component comprising a third lens surface along an interface of first and second fluids contained within an additional fluid reservoir of said lens;
   said first and second fluids of said third fluid lens component are immiscible with respect to each other;
   said first and second lens surfaces are offset relative to each other along a direction x orthogonal to said axis of optical propagation z; and
   one or both of said first and second lens surfaces is offset relative to said third lens surface along a direction y orthogonal to said direction x and said axis of optical propagation z.

4. An optical system comprising the fluid lens of claim 1, wherein said fluid lens is configured to direct light propagating in said optical system by creating a global beam steering effect in said propagating light, varying the focal length of the fluid lens, or both.

5. An optical system as claimed in claim 4 wherein:
   said optical system comprises a semiconductor laser comprising a laser chip, a light wavelength conversion device, and said fluid lens; and
   said fluid lens is configured to direct light propagating from an output of said laser chip to an input of said light wavelength conversion device by creating a global beam steering effect in said propagating light, varying the focal length of the fluid lens, or both.

6. A fluid lens as claimed in claim 1 wherein said lens comprises control electrodes configured to generate at least one electric field capable of altering the shape, orientation, or shape and orientation of at least one of said lens surfaces.

7. A fluid lens as claimed in claim 1 wherein said lens comprises control electrodes configured to generate at least two distinct electric fields capable of altering independently the first and second lens surfaces.

8. A fluid lens as claimed in claim 1 wherein said lens comprises control electrodes configured to generate at least two distinct electric fields capable of creating a global beam steering effect by altering independently said first and second lens surfaces.

9. A fluid lens as claimed in claim 1 wherein said lens comprises control electrodes configured to generate at least two distinct electric fields capable of varying the focal length of said lens by altering independently said first and second lens surfaces.

10. A fluid lens as claimed in claim 1 wherein:
said lens comprises a first set of control electrodes configured to generate independently at least two distinct electric fields, each capable of altering at least one aspect of said first lens surface; and
said lens comprises a second set of control electrodes configured to generate independently at least two additional distinct electric fields, each capable of altering at least one aspect of said second lens surface.

11. A fluid lens as claimed in claim 1 wherein said fluid reservoir defines a substantially continuous volume.

12. A fluid lens as claimed in claim 1 wherein said first fluid is mechanically coupled to said third fluid by said second fluid.

13. A fluid lens as claimed in claim 1 wherein said first fluid is mechanically coupled to said third fluid via said second fluid and one or more additional fluids.

14. A fluid lens as claimed in claim 1 wherein said first fluid is mechanically coupled to said third fluid via said second fluid and a fluid partition provided in said second fluid.

15. A fluid lens as claimed in claim 1 wherein the immiscibility of the first, second, and third fluids is attributable to properties of the fluids, properties of a membrane provided between the fluids, or a combination thereof.

16. A fluid lens as claimed in claim 1 wherein the index of refraction of said second fluid is substantially different that the respective indices of refraction of said first and third fluids.

17. A fluid lens comprising first and second fluid lens components, wherein:
said first fluid lens component comprises a first lens surface along an interface of immiscible fluids contained by a first fluid reservoir of said first lens component;
said second fluid lens component comprises a second lens surface along an interface of immiscible fluids contained by a second fluid reservoir of said second lens component;
said first fluid reservoir of said first fluid lens is coupled to said second fluid reservoir of said second fluid lens via a fluid partition;
respective indices of refraction of said immiscible fluids contained by said first lens component are substantially different;
respective indices of refraction of said immiscible fluids contained by said second lens component are substantially different;
said fluid lens is configured such that an optical signal may propagate from an input side of said lens to an output side of said lens along an axis of optical propagation extending through said first and second lens surfaces of said first and second lens components;
said first lens surface of said first fluid reservoir and said second lens surface of said second fluid reservoir are offset relative to each other along a direction x orthogonal to said axis of optical propagation z; and
said fluid lens is configured to permit alteration of at least one of said first and second lens surfaces.

18. A fluid lens as claimed in claim 17 wherein said fluid partition comprises a single optical interface at an output of said first fluid lens component and an input of said second fluid lens component.

19. A fluid lens as claimed in claim 17 wherein said fluid partition comprises a dual optical interface comprising an output window of said first fluid lens component and an input window of said second fluid lens component.

20. A method of tuning a fluid lens, wherein:
said fluid lens comprises first and second fluid lens components;
said first fluid lens component comprises a first lens surface formed along an interface of first and second fluids contained within a fluid reservoir of said lens;
said first and second fluids are immiscible with respect to each other;
said second fluid lens component comprises a second lens surface formed along an interface of second and third fluids contained within said fluid reservoir;
said second and third fluids are immiscible with respect to each other;
said first fluid is mechanically coupled to said third fluid via said second fluid;
an index of refraction of said second fluid is substantially different than an index of refraction of said first and third fluids;
said fluid lens is configured such that an optical signal may propagate from an input side of said lens to an output side of said lens along an axis of optical propagation extending through said first and second lens surfaces of said first and second lens components; and
either the focus, the propagating direction, or both the focus and the propagating direction of an optical signal output from said lens are tuned by altering the first lens surface, the second lens surface, or both the first and second lens surfaces.

* * * * *